United States Patent
Park et al.

(10) Patent No.: US 9,245,690 B2
(45) Date of Patent: Jan. 26, 2016

(54) MULTILAYER CERAMIC CAPACITOR, BOARD HAVING THE SAME MOUNTED THEREON, AND METHOD OF MANUFACTURING THE SAME

(71) Applicant: SAMSUNG ELECTRO-MECHANICS CO., LTD., Suwon, Gyunggi-do (KR)

(72) Inventors: Sang Soo Park, Gyunggi-do (KR); Heung Kil Park, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 206 days.

(21) Appl. No.: 14/137,827

(22) Filed: Dec. 20, 2013

(65) Prior Publication Data

US 2015/0022945 A1    Jan. 22, 2015

(30) Foreign Application Priority Data

Jul. 22, 2013  (KR) .......................... 10-2013-0086096

(51) Int. Cl.
| | | |
|---|---|---|
| *H01G 4/30* | (2006.01) | |
| *H01G 4/232* | (2006.01) | |
| *H01G 4/005* | (2006.01) | |
| *H01G 4/008* | (2006.01) | |

(52) U.S. Cl.
CPC ................ *H01G 4/30* (2013.01); *H01G 4/232* (2013.01); *H01G 4/2325* (2013.01); *H01G 4/005* (2013.01); *H01G 4/008* (2013.01)

(58) Field of Classification Search
CPC ......... H01G 4/30; H01G 4/005; H01G 4/008; H01G 4/10; H01G 4/228; H01G 4/232; H01G 4/2325

See application file for complete search history.

(56) References Cited

U.S. PATENT DOCUMENTS

| | | | | |
|---|---|---|---|---|
| 5,107,394 A | * | 4/1992 | Naito ................... | H01C 17/281 29/25.42 |
| 5,805,409 A | * | 9/1998 | Takahara ............. | H01G 4/2325 361/301.4 |
| 6,496,355 B1 | | 12/2002 | Galvagni et al. | |
| 6,807,047 B2 | | 10/2004 | Togashi et al. | |

(Continued)

FOREIGN PATENT DOCUMENTS

| | | |
|---|---|---|
| JP | 6-84687 A | 3/1994 |
| JP | 2003-124062 A | 4/2003 |

(Continued)

OTHER PUBLICATIONS

Notice of Office Action Japanese Patent Application No. 2013-261280 dated Apr. 14, 2015 with full English translation.

*Primary Examiner* — Dion R Ferguson
(74) *Attorney, Agent, or Firm* — McDermott Will & Emery LLP

(57) ABSTRACT

There is provided a multilayer ceramic capacitor including: a ceramic body including a plurality of dielectric layers; a plurality of first and second internal electrodes disposed in the ceramic body to be alternately exposed to the third and fourth end surfaces, having the dielectric layers interposed therebetween; and first and second external electrodes electrically connected to the first and second internal electrodes, wherein the first and second external electrodes include: first and second conductive glass layers; first and second conductive resin layers containing copper and an epoxy; and first and second insulating layers.

26 Claims, 11 Drawing Sheets

(56) References Cited

U.S. PATENT DOCUMENTS

| | | | |
|---|---|---|---|
| 7,706,123 B2 | 4/2010 | Togashi et al. | |
| 2001/0043454 A1* | 11/2001 | Yoshii | H01G 4/232 361/321.2 |
| 2008/0112109 A1* | 5/2008 | Muto | C04B 35/4682 361/301.4 |
| 2009/0040688 A1* | 2/2009 | Kayatani | H01G 4/2325 361/321.1 |
| 2009/0086405 A1 | 4/2009 | Lee et al. | |
| 2009/0290281 A1* | 11/2009 | Nagamoto | H01G 4/2325 361/305 |
| 2011/0007449 A1 | 1/2011 | Seo et al. | |
| 2012/0152604 A1 | 6/2012 | Ahn et al. | |

FOREIGN PATENT DOCUMENTS

| | | |
|---|---|---|
| JP | 3847265 A | 9/2006 |
| JP | 2009-88517 A | 4/2009 |
| JP | 2011-18874 A | 1/2011 |
| KR | 10-1058697 B1 | 8/2011 |

\* cited by examiner

MULTILAYER CERAMIC CAPACITOR, BOARD HAVING THE SAME MOUNTED THEREON, AND METHOD OF MANUFACTURING THE SAME

CROSS-REFERENCE TO RELATED APPLICATION

This application claims the benefit of Korean Patent Application No. 10-2013-0086096 filed on Jul. 22, 2013, with the Korean Intellectual Property Office, the disclosure of which is incorporated herein by reference.

BACKGROUND

The present disclosure relates to a multilayer ceramic capacitor, a board having the same mounted thereon, and a method of manufacturing the same.

Since such a multilayer ceramic capacitor (MLCC) has advantages such as a small size, high capacitance, ease of mounting, or the like, such a multilayer ceramic capacitor may be used as a component in various electronic devices.

For example, the multilayer ceramic capacitor may be used as a chip shaped condenser mounted on printed circuit boards of various electronic products such as a display device, for example, a liquid crystal display (LCD), a plasma display panel (PDP), and the like, as well as including a computer, a personal digital assistant (PDA), and a mobile phone to serve to charge electricity or discharge electricity.

Generally, the multilayer ceramic capacitor may have a structure in which a plurality of dielectric layers and internal electrodes having different polarities between the dielectric layers are alternately disposed.

In this case, since the dielectric layers have piezoelectric properties, when a direct current (DC) voltage or an alternating current (AC) voltage is applied to the multilayer ceramic capacitor, a piezoelectric phenomenon may be generated between the internal electrodes, such that a volume of a ceramic body is expanded and contracted according to a frequency, thereby generating periodic vibrations.

The vibrations are transmitted to a printed circuit board through external electrodes and a solder connecting the external electrodes of the multilayer ceramic capacitor to the printed circuit board, such that the entire printed circuit board becomes a sound reflective surface to generate a vibration sound to be a noise.

In this case, the solder connecting the external electrode and the printed circuit board is inclined from both side surfaces and both end surfaces of the ceramic body along a surface of the external electrode at a predetermined height. As a volume and a height of the solder increase, vibrations of the multilayer ceramic capacitor may be further easily transferred to the printed circuit board, such that vibration sound could be severely generated.

The vibration sound may be in an audible frequency region of 20 to 20,000 Hz, causing listener discomfort, and the vibration sound causing listener discomfort refers to an acoustic noise.

Recently, in electronic devices, since acoustic noise generated in the multilayer ceramic capacitor as described above may be significant due to a decreased noise of components, research into a technology of effectively decreasing the acoustic noise generated in the multilayer ceramic capacitor has been required.

A multilayer ceramic capacitor and a board having the same mounted thereon have been disclosed in the following Patent Document 1, but a structure in which an external electrode includes an insulating layer for decreasing acoustic noise has not been disclosed therein.

RELATED ART DOCUMENT (Patent Document 1) Korean Patent Registration No. 1058697

SUMMARY

An aspect of the present disclosure may provide a multilayer ceramic capacitor capable of effectively decreasing acoustic noise occurring when vibrations generated in the multilayer ceramic capacitor by a piezoelectric phenomenon are transmitted to a printed circuit board through an external electrode and a solder.

According to an aspect of the present disclosure, a multilayer ceramic capacitor may include: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body to be alternately exposed to the third and fourth end surfaces, having the dielectric layers interposed therebetween; and first and second external electrodes electrically connected to the first and second internal electrodes, wherein in a cross-section of the ceramic body in a thickness-length direction, the first and second external electrodes include: first and second conductive glass layers formed to be extended from the third and fourth end surfaces to portions of the first and second main surfaces; first and second conductive resin layers containing copper and an epoxy, formed on the first and second conductive glass layers to be extended from the third and fourth end surfaces to portions of the first and second main surfaces, and having a width greater than that of the first and second conductive glass layers formed on the first and second main surfaces; and first and second insulating layers formed to be extended from the third and fourth end surfaces to portions of the first and second main surfaces so as to cover the first and second conductive glass layers and the first and second conductive resin layers formed on the third and fourth end surfaces, while having a width smaller than that of the first and second conductive resin layers formed on the first and second main surfaces.

The ceramic body may be formed by stacking the plurality of dielectric layers in the thickness direction.

The ceramic body may be formed by stacking the plurality of dielectric layers in the width direction and include at least one gap layer formed therein in the width direction.

According to another aspect of the present disclosure, a multilayer ceramic capacitor may include: a ceramic body including a plurality of dielectric layers stacked in a thickness direction and having first and second main surfaces facing each other in the thickness direction, third and fourth end surfaces facing each other in a length direction, and fifth and sixth side surfaces facing each other in a width direction; a plurality of first and second internal electrodes disposed in the ceramic body to face each other, having the dielectric layers interposed therebetween, and having a pair of first lead parts and a pair of second lead parts exposed to the fifth and sixth side surfaces; and first and second external electrodes electrically connected to the first and second internal electrodes, wherein in a cross-section of the ceramic body in a thickness-width direction, the first and second external electrodes include: a pair of first conductive glass layers and a pair of second conductive glass layers formed to be extended from the fifth and sixth side surfaces to portions of the first and second main surfaces so as to cover the pair of the first lead parts and the pair of second lead parts, respectively; first and second insulating layers containing copper and epoxy, formed to be extended from the fifth and sixth side surfaces to portions of the first and second main surfaces so as to cover the pair of the first conductive glass layers and the pair of the second conductive glass layers formed on the fifth and sixth side surfaces, and having a width smaller than that of the pair of the first conductive glass layers and the pair of the second conductive glass layers formed on the first and second main surfaces; and a pair of first conductive resin layers and a pair of second conductive resin layers formed to be extended from the first and second main surfaces to portions of the fifth and sixth side surfaces so as to cover the pair of the first conductive glass layers and the pair of the second conductive glass layers formed on the first and second main surfaces, respectively.

The first and second external electrodes may further include first and second plating layers formed on the first and second conductive resin layers on the first and second main surfaces.

The first and second plating layers may include: a nickel (Ni) plating layer formed on the first and second conductive resin layers; and a tin (Sn) plating layer formed on the nickel plating layer.

The first and second insulating layers may be formed of an epoxy resist.

According to another aspect of the present disclosure, a method of manufacturing a multilayer ceramic capacitor may include: preparing a laminate by stacking a plurality of ceramic sheets including first and second internal electrodes formed thereon in such a manner that the first and second internal electrodes are disposed to face each other, having the ceramic sheets interposed therebetween, and then pressing the stacked ceramic sheets; preparing a ceramic body having first and second main surfaces facing each other in a thickness direction, third and fourth end surfaces to which the first and second internal electrodes are alternately exposed in a length direction, and fifth and sixth side surfaces facing each other in a width direction by cutting the laminate into portions each corresponding to one capacitor and firing the cut portion; and forming first and second external electrodes on the ceramic body to be electrically connected to the first and second internal electrodes, wherein in a cross-section of the ceramic body in a thickness-length direction, the forming of the first and second external electrodes includes: forming first and second conductive glass layers to be extended from the third and fourth end surfaces to portions of the first and second main surfaces using a conductive paste containing copper and glass; forming first and second conductive resin layers to be extended from the third and fourth end surfaces to portions of the first and second main surfaces using a conductive resin paste containing copper and epoxy, and have a width greater than that of the first and second conductive glass layers formed on the first and second main surfaces; and forming first and second insulating layers to be extended from the third and fourth end surfaces to portions of the first and second main surfaces using an epoxy resist so as to cover the first and second conductive glass layers and the first and second conductive resin layers formed on the third and fourth end surfaces, and to have a width smaller than that of the first and second conductive resin layers formed on the first and second main surfaces.

According to another aspect of the present disclosure, a method of manufacturing a multilayer ceramic capacitor may include: preparing a laminate by stacking a plurality of ceramic sheets including first and second internal electrodes formed thereon in such a manner that the first and second internal electrodes are disposed to face each other, having the ceramic sheets interposed therebetween, while having a pair of first lead parts and a pair of second lead parts extended to both side surfaces, respectively, and then pressing the stacked ceramic sheets; preparing a ceramic body having first and second main surfaces facing each other in a thickness direction, third and fourth end surfaces facing each other in a length direction, and fifth and sixth side surfaces to which the pair of the first lead parts and the pair of the second lead parts are exposed in a width direction by cutting the laminate into portions each corresponding to one capacitor and firing the cut portion; and forming first and second external electrodes on the ceramic body to be electrically connected to the first and second internal electrodes, wherein in a cross-section of the ceramic body in a thickness-width direction, the forming of the first and second external electrodes may include: forming first and second conductive glass layers using a conductive paste containing copper and glass to be extended from the fifth and sixth side surfaces to portions of the first and second main surfaces so as to cover the pair of first lead parts and the pair of the second lead parts, respectively; forming first and second insulating layers using an epoxy resist to be extended from the fifth and sixth side surfaces to portions of the first and second main surfaces so as to cover the pair of the first conductive glass layers and the pair of the second conductive glass layers formed on the fifth and sixth side surfaces and to have a width smaller than that of the first and second conductive glass layers formed on the first and second main surfaces; and forming a pair of first conductive resin layers and a pair of second conductive resin layers using a conductive resin paste containing copper-epoxy to be extended from the first and second main surfaces to the fifth and six side surfaces so as to cover the pair of the first conductive glass layers and the pair of the second conductive glass layers formed on the first and second main surfaces, respectively.

According to another aspect of the present disclosure, a board having a multilayer ceramic capacitor mounted thereon may include: a printed circuit board having first and second electrode pads formed thereon; and at least one multilayer ceramic capacitor installed on the printed circuit board, wherein the multilayer ceramic capacitor may include: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body to be alternately exposed to the third and fourth end surfaces, having the dielectric layers interposed therebetween; and first and second external electrodes electrically connected to the first and second internal electrodes and connected to the first and second electrode pads by a solder on the first or second main surfaces, in a cross-section of the ceramic body in a thickness-length direction, the first and second external electrodes including: first and second conductive glass layers formed to be extended from the third and fourth end surfaces to portions of the first and second main surfaces; first and second conductive resin layers containing copper and an epoxy, formed on the first and second conductive glass layers to be extended from the third and fourth end surfaces to portions of the first and second main surfaces, and having a width greater than that of the first and second conductive glass layers formed on the first and second main surfaces; and first and second insulating layers formed to be extended from the third and fourth end surfaces to portions of the first and second main surfaces so as to cover the first and second conductive glass layers and the first and second conductive resin layers formed on the third and fourth end surfaces, while having a width smaller than that of the first and second conductive resin layers formed on the first and second main surfaces.

According to another aspect of the present disclosure, a board having a multilayer ceramic capacitor mounted thereon may include: a printed circuit board having first and second electrode pads formed thereon; and at least one multilayer ceramic capacitor installed on the printed circuit board, wherein the multilayer ceramic capacitor includes: a ceramic body including a plurality of dielectric layers stacked in a thickness direction and having first and second main surfaces facing each other in the thickness direction, third and fourth end surfaces facing each other in a length direction, and fifth and sixth side surfaces facing each other in a width direction; a plurality of first and second internal electrodes disposed in the ceramic body to face each other, having the dielectric layers interposed therebetween, and having a pair of first lead parts and a pair of second lead parts exposed to the fifth and sixth side surfaces; and first and second external electrodes electrically connected to the first and second internal electrodes and connected to the first and second electrode pads by a solder on the first or second main surface, in a cross-section of the ceramic body in a thickness-width direction, the first and second external electrodes including: a pair of first conductive glass layers and a pair of second conductive glass layers formed to be extended from the fifth and sixth side surfaces to portions of the first and second main surfaces so as to cover the pair of the first lead parts and the pair of second lead parts, respectively; first and second insulating layers containing copper and epoxy, formed to be extended from the fifth and sixth side surfaces to portions of the first and second main surfaces so as to cover the pair of the first conductive glass layers and the pair of the second conductive glass layers formed on the fifth and sixth side surfaces, and having a width smaller than that of the pair of the first conductive glass layers and the pair of the second conductive glass layers formed on the first and second main surfaces; and a pair of first conductive resin layers and a pair of second conductive resin layers formed to be extended from the first and second main surfaces to portions of the fifth and sixth side surfaces so as to cover the pair of the first conductive glass layers and the pair of the second conductive glass layers formed on the first and second main surfaces, respectively.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
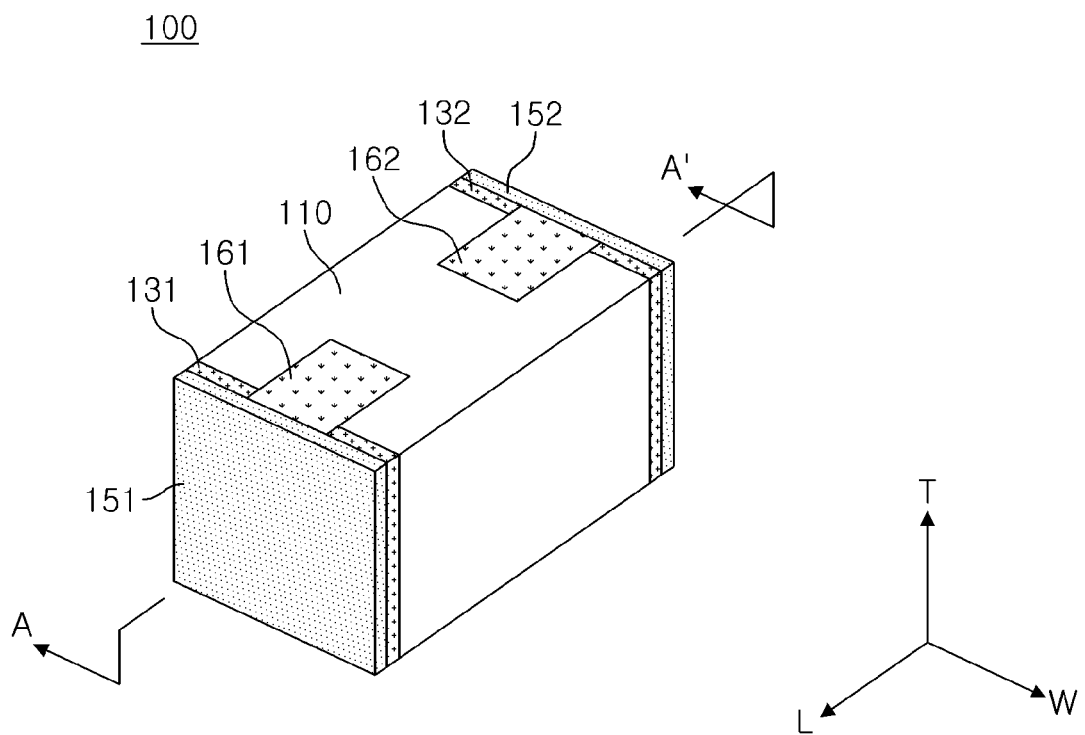
FIG. 1 is a perspective view schematically showing a multilayer ceramic capacitor according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Multilayer Ceramic Capacitor

Figure 2:
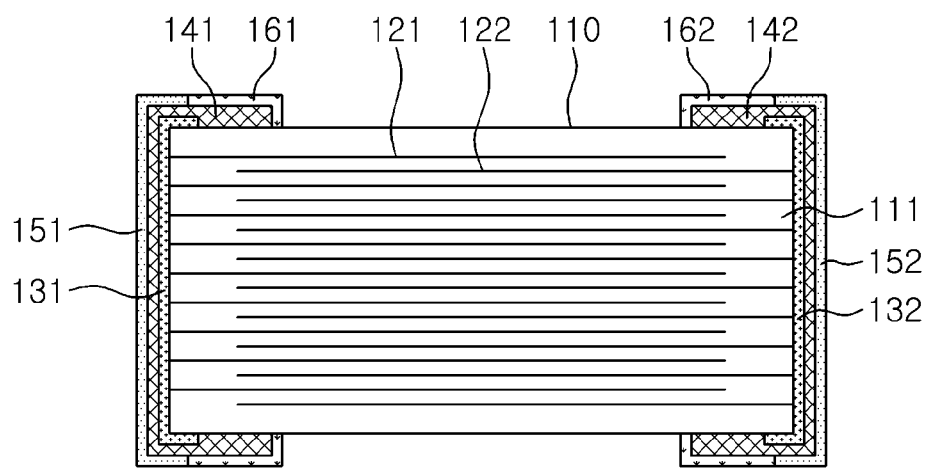
FIG. 2 is a cross-sectional view taken along line A-A' of FIG. 1.

FIG. 1 is a perspective view schematically showing a multilayer ceramic capacitor according to an exemplary embodiment of the present disclosure, and FIG. 2 is a cross-sectional view taken along line A-A' of FIG. 1.

Referring to FIGS. 1 and 2, a multilayer ceramic capacitor 100 according to the exemplary embodiment of the present disclosure may include a ceramic body 110 having a plurality of dielectric layers 111 stacked therein in a thickness direction, a plurality of first and second internal electrodes 121 and 122, and first and second external electrodes electrically connected to the first and second internal electrodes 121 and 122, respectively.

The ceramic body 110 may be formed by stacking the plurality of dielectric layers 111 in a thickness direction thereof and performing firing thereon, wherein boundaries between adjacent dielectric layers 111 may be integrated such that they may not be readily discernible.

In addition, the ceramic body 110 may have a hexahedral shape. Directions of a hexahedron will be defined in order to clearly describe the exemplary embodiments of the present disclosure. L, W and T shown in FIG. 1 refer to a length direction, a width direction, and a thickness direction, respectively.

In the present exemplary embodiment, surfaces of the ceramic body 110, facing each other in a direction in which the dielectric layers 111 are stacked, that is, in the thickness direction, may be defined as first and second main surfaces, end surfaces connecting the first and second main surfaces and facing each other in the length direction may be defined as third and fourth end surfaces, and surfaces facing each other in the width direction may be defined as fifth and sixth side surfaces.

The dielectric layer 111 may contain a ceramic material having high permittivity, for example, a barium titanate ($BaTiO_3$) based ceramic powder, or the like, but the present disclosure is not limited thereto as long as sufficient capacitance may be obtained.

In addition, various ceramic additives such as transition metal oxides or carbides, a rare earth element, magnesium (Mg), aluminum (Al), or the like, an organic solvent, a plasticizer, a binder, a dispersant, and the like, in addition to the ceramic powder, may be further added to the dielectric layer 111, as needed.

The first and second internal electrodes 121 and 122, electrodes having different polarities, may be formed and stacked on at least one surface of a ceramic sheet forming the dielectric layer 111, and may be disposed in the ceramic body 110 to be alternately exposed to the third and fourth end surfaces, having each dielectric layer 111 interposed therebetween.

In this case, the first and second internal electrodes 121 and 122 may be electrically insulated from each other by the dielectric layer disposed therebetween, and capacitance of the multilayer ceramic capacitor 100 may be in proportion to an area of an overlapped portion between the first and second internal electrodes 121 and 122 in the direction in which the dielectric layers 111 are stacked.

In addition, the first and second external electrodes may be formed of a conductive metal, for example, one of silver (Ag), lead (Pb), platinum (Pt), nickel (Ni), and copper (Cu), an alloy thereof, or the like, but the present disclosure is not limited thereto.

The first and second external electrodes may include first and second conductive glass layers 131 and 132, first and second conductive resin layers 141 and 142, and first and second insulating layers 151 and 152.

In the present exemplary embodiment, the first and second conductive glass layers 131 and 132 may be extended from the third and fourth end surfaces of the ceramic body 110 to portions of the first and second main surfaces thereof in a cross-section of the ceramic body 110 in a thickness-length direction to cover the plurality of first and second internal electrodes 121 and 122 alternately exposed to the third and fourth end surfaces to thereby be electrically connected thereto.

In this case, the first and second conductive glass layers 131 and 132 may be formed using a paste containing copper and glass (Cu and glass) in order to provide high reliability such as excellent heat cycle resistance, moisture resistance, and the like, while having excellent electrical properties, but the present disclosure is not limited thereto.

The first and second conductive resin layers 141 and 142 may be formed on the first and second conductive glass layers 131 and 132 and serve to suppress a plating solution from infiltrating into the internal electrode at the time of forming first and second plating layers to be described below.

In addition, the first and second conductive resin layers 141 and 142 may be formed to be extended from the third and fourth end surfaces of the ceramic body 110 to portions of the first and second main surfaces thereof, while having a width greater than that of the first and second conductive glass layers 131 and 132 formed on the first and second main surfaces.

In this case, the first and second conductive resin layers 141 and 142 may be formed, for example, using a paste containing copper and epoxy (Cu and epoxy) capable of absorbing mechanical stress to improve reliability, but the present disclosure is not limited thereto.

The first and second insulating layers 151 and 152 may be formed to cover the first and second conductive glass layers 131 and 132 and the first and second conductive resin layers 141 and 142 formed on the third and fourth end surfaces. The first and second insulating layers 151 and 152 may be formed such that a solder is not formed or the formation of a solder is minimized on circumferential surfaces except for surfaces of the first and second external electrodes to be mounted on a printed circuit board at the time of mounting the multilayer ceramic capacitor 100 on a printed circuit board.

Further, the first and second insulating layers 151 and 152 may be formed to be extended from the third and fourth end surfaces of the ceramic body 110 to portions of the first and second main surfaces thereof, while having a width smaller than that of the first and second conductive resin layers 141 and 142 formed on the first and second main surfaces so as to allow portions of the first and second conductive resin layers 141 and 142 formed on the first and second main surfaces to be exposed.

In this case, the first and second insulating layers 151 and 152 may be formed using an epoxy resist, but the present disclosure is not limited thereto.

Meanwhile, the first and second external electrodes may further include first and second plating layers 161 and 162 formed on the first and second conductive resin layers 141 and 142 externally exposed from the first and second main surfaces.

Further, the first and second plating layers 161 and 162 may include a nickel (Ni) plating layer formed on the first and second conductive resin layers 141 and 142 and a tin (Sn) plating layer formed on the nickel plating layer.

The first and second plating layers 161 and 162 as described above are provided to increase adhesion strength between the multilayer ceramic capacitor 100 and the printed circuit board at the time of mounting the multilayer ceramic capacitor 100 on the printed circuit board, or the like, by a solder. The plating may be performed by a method known in the art, and lead-free plating may be preferable in consideration of eco-friendly factors, but the present disclosure is not limited thereto.

Method of Manufacturing a Multilayer Ceramic Capacitor

Hereinafter, a method of manufacturing a multilayer ceramic capacitor according to an exemplary embodiment of the present disclosure will be described.

First, a plurality of ceramic sheets may be prepared. The ceramic sheets are provided to form the dielectric layers 111 of the ceramic body 110 and may be manufactured in a sheet shape having a thickness of several μm by mixing a ceramic powder, a polymer, a solvent, and the like, to prepare a slurry, applying the prepared slurry on carrier films using a doctor blade method, or the like, and drying the applied slurry.

Next, the first and second internal electrodes 121 and 122 are formed by printing a conductive paste at a predetermined thickness on at least one surface of the plurality of respective ceramic sheets.

Here, the first and second internal electrodes 121 and 122 are exposed through the both end surfaces of the ceramic sheets in the length direction, respectively.

Methods of printing the conductive paste may include a screen printing method, a gravure printing method, and the like, but the present invention is not limited thereto.

Next, a laminate may be prepared by stacking a plurality of ceramic sheets including the first and second internal electrodes 121 and 122 formed thereon in such a manner that the first and second internal electrodes 121 and 122 are disposed to face each other, having the ceramic sheet interposed therebetween, and then pressing the stacked ceramic sheets.

In this case, the laminate may be prepared by stacking the plurality of ceramic sheets in a thickness direction and pressing the stacked ceramic sheets.

Figure 3A:
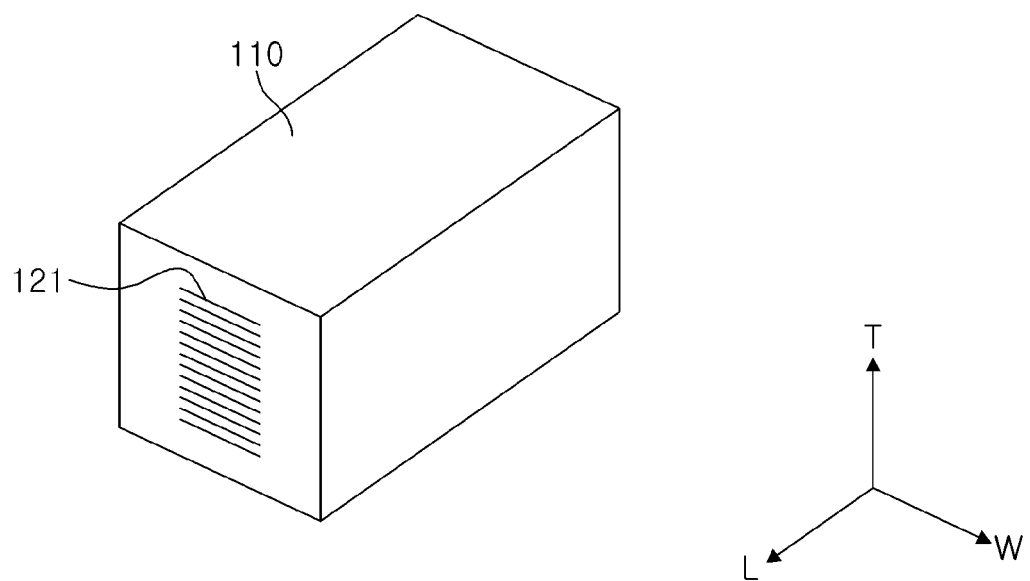
FIGS. 3A through 3E are perspective views showing respective processes of a manufacturing method of the multilayer ceramic capacitor according to the exemplary embodiment of the present disclosure.

Then, the laminate is cut into portions, each corresponding to one capacitor chip, and then the portions are fired at a high temperature to prepare the ceramic bodies 110 each having first and second main surfaces facing each other in the thickness direction, third and fourth end surfaces to which the first and second internal electrodes 121 and 122 are alternately exposed in a length direction, and fifth and sixth side surfaces facing each other in a width direction, as shown in FIG. 3A.

Next, in a cross-section of the ceramic body 110 in a thickness-length direction, first and second external electrodes may be formed to be electrically connected to portions of the first and the second internal electrodes 121 and 122 exposed to the third and fourth end surfaces.

Hereinafter, a method of forming the first and second external electrodes will be described in detail.

Figure 3B:
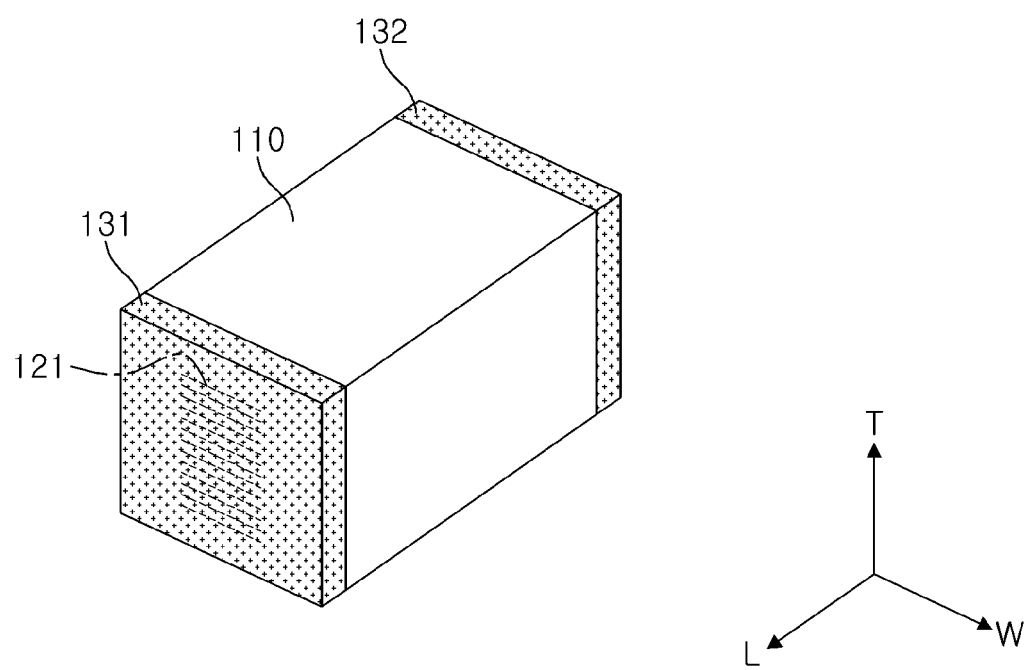

First, referring to FIG. 3B, the first and second conductive glass layers 131 and 132 may be formed using a conductive paste containing copper and glass and may be extended from the third and fourth end surfaces of the ceramic body 110 to portions of the first and second main surfaces thereof in order to cover the first and second internal electrodes exposed to the third and fourth end surfaces of the ceramic body 110.

The conductive paste may be applied using a dipping method or various printing methods, but the present disclosure is not limited thereto. In addition, after an application process, a heat treatment process is performed, such that the applied conductive paste may be cured.

Figure 3C:
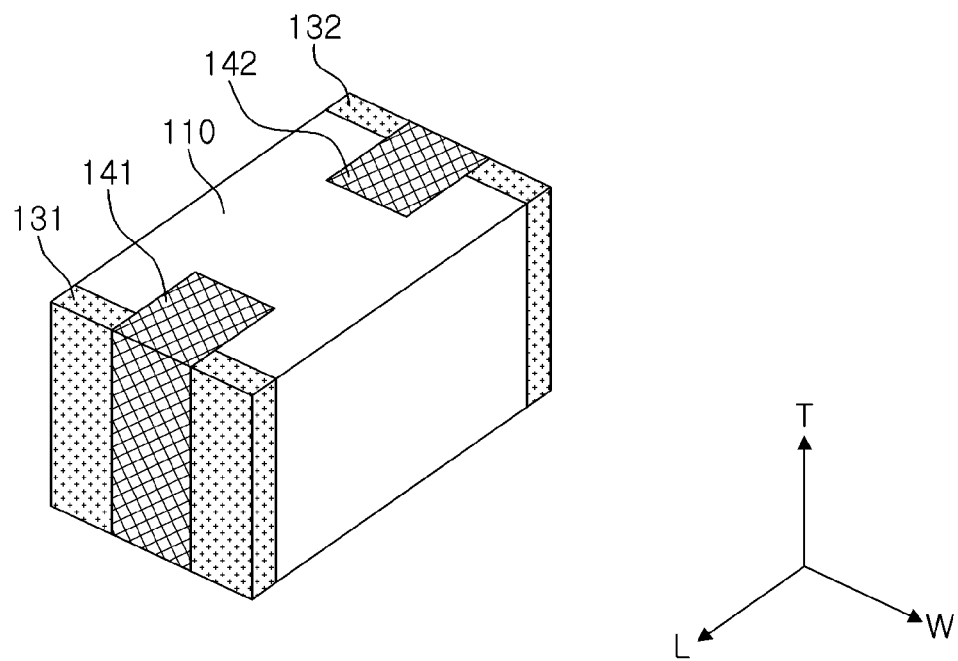

Thereafter, referring to FIG. 3C, the first and second conductive resin layers 141 and 142 may be formed on the first and second conductive glass layers 131 and 132 so as to be extended from the third and fourth end surfaces to portions of the first and second main surfaces using a conductive resin paste containing copper and epoxy. In this case, the first and second conductive resin layers 141 and 142 may formed on the first and second main surfaces, while having a width greater than that of the first and second conductive glass layers 131 and 132 formed on the first and second main surfaces.

The conductive resin paste may be applied using a dipping method or various printing methods, but the present disclosure is not limited thereto. In addition, after an application process, a heat treatment process is performed, such that the applied conductive resin paste may be cured.

Figure 3D:
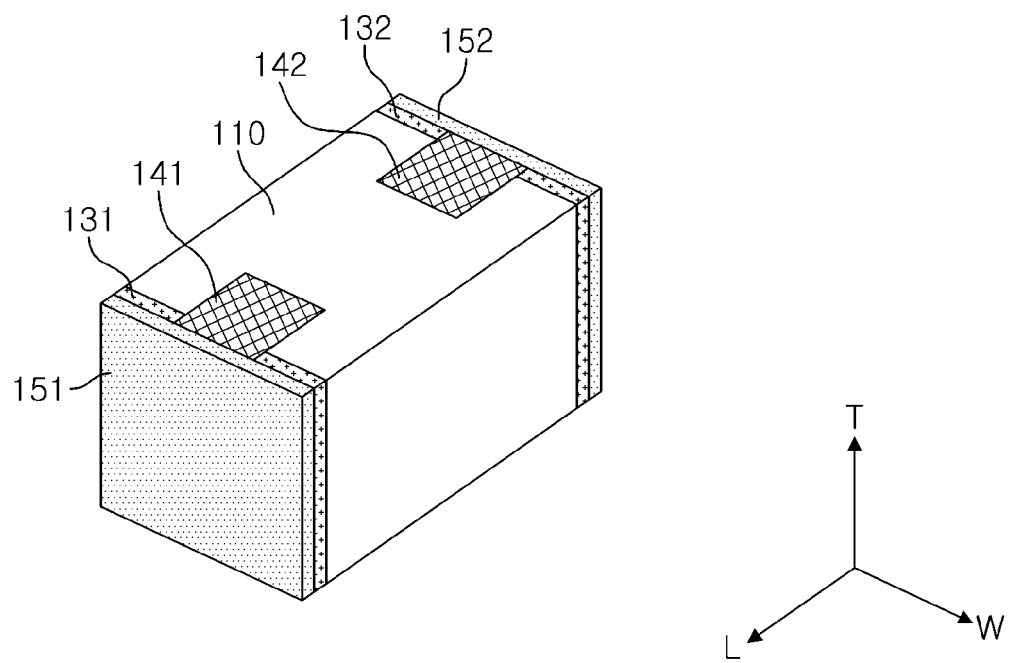

Then, referring to FIG. 3D, the first and second insulating layers 151 and 152 may be formed using an epoxy resist and extended from the third and fourth end surfaces to portions of the first and second main surfaces so as to cover the first and second conductive glass layers 131 and 132 and the first and second conductive resin layers 141 and 142 formed on the third and fourth end surfaces. In this case, the first and second insulating layers 151 and 152 may have a width smaller than that of the first and second conductive resin layers 141 and 142 formed on the first and second main surfaces.

The epoxy resist may be applied using a dipping method or various printing methods, but the present disclosure is not limited thereto.

In addition, after an application process, a heat treatment process is performed, such that the applied epoxy resist may be cured.

Figure 3E:
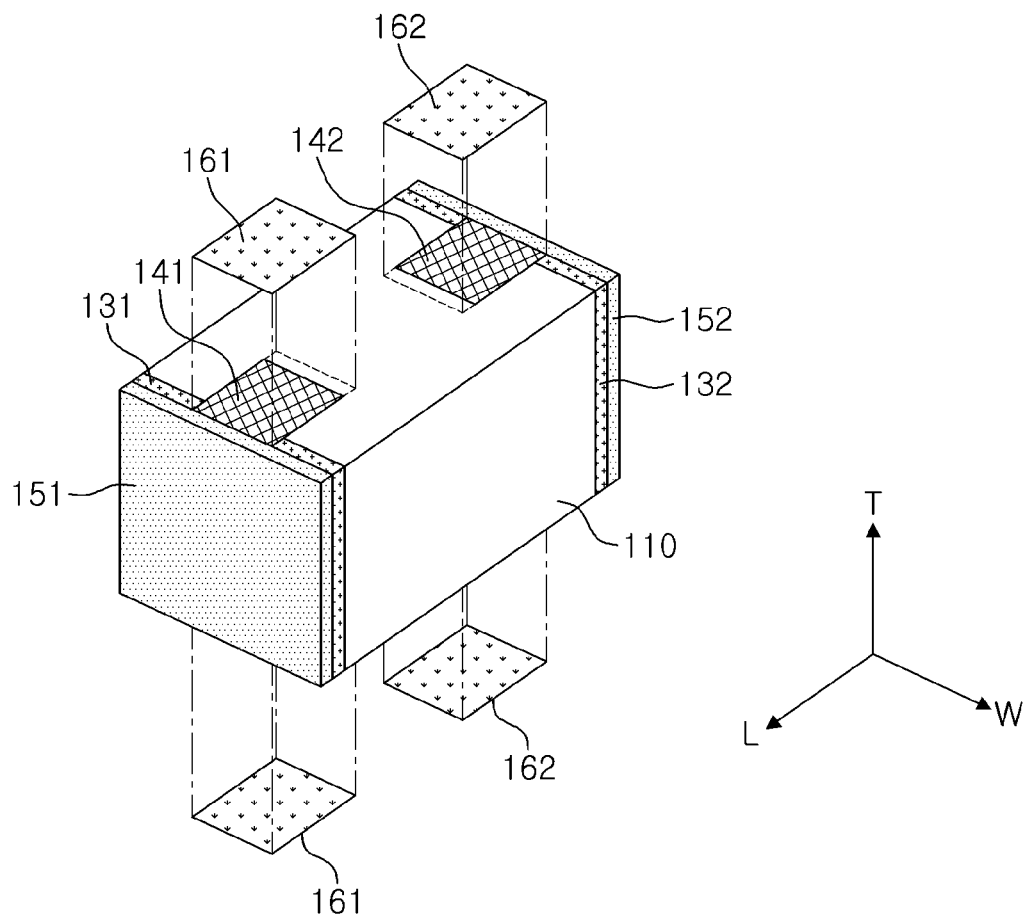

In this case, referring to FIG. 3E, if necessary, after forming of the first and second insulating layers 151 and 152, the first and second plating layers 161 and 162 may be formed by plating surfaces of the first and second conductive resin layers 141 and 142 exposed externally from the first and second main surfaces using an electroplating method, or the like.

As materials used in the plating, nickel, tin, a nickel-tin alloy, and the like, may be used, but the present disclosure is not limited thereto.

Further, if necessary, the first and second plating layers 161 and 162 may be formed by sequentially stacking a nickel plating layer and a tin plating layer on the surfaces of the first and second conductive resin layers 141 and 142.

Board Having Multilayer Ceramic Capacitor Mounted Thereon

Figure 4:
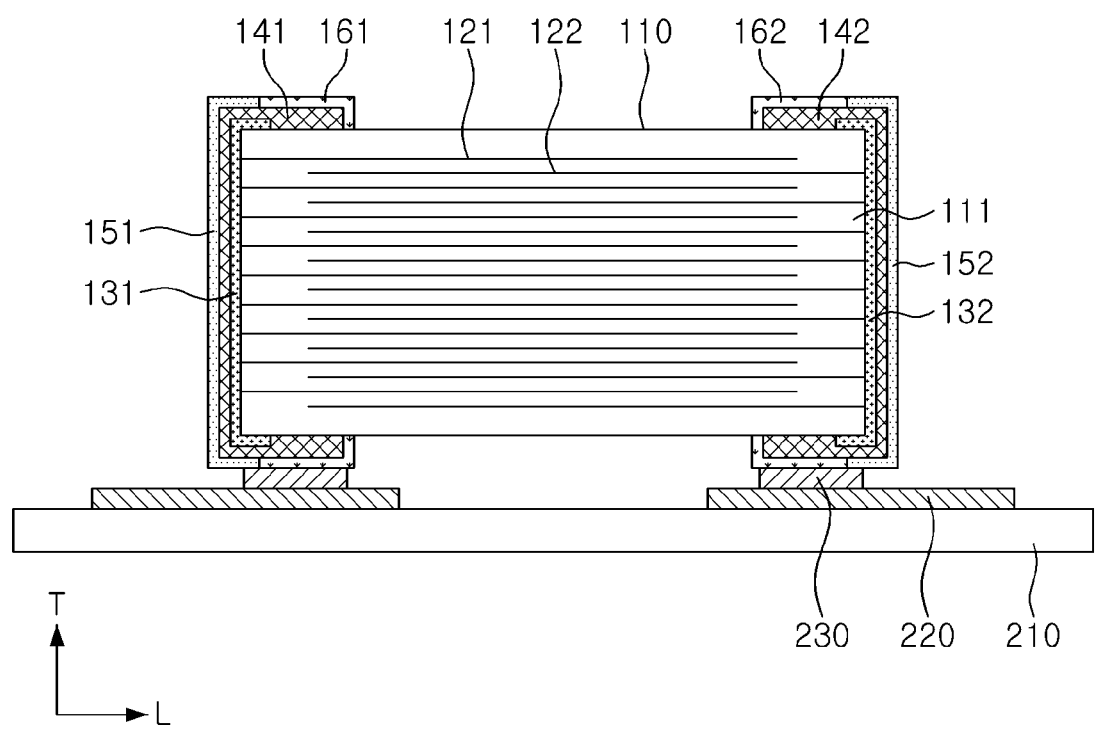
FIG. 4 is a side cross-sectional view schematically showing a board having the multilayer ceramic capacitor mounted thereon according to the exemplary embodiment of the present disclosure.

FIG. 4 is a side cross-sectional view schematically showing a board having the multilayer ceramic capacitor mounted thereon according to the exemplary embodiment of the present disclosure.

Referring to FIG. 4, a board having the multilayer ceramic capacitor 100 according to the exemplary embodiment of the present disclosure mounted thereon may include a printed circuit board 210 having the multilayer ceramic capacitor 100 mounted thereon and first and second electrode pads 220 formed on the printed circuit board 210 to be spaced apart from each other.

Here, the multilayer ceramic capacitor 100 may be mounted on the printed circuit board 210 such that the first or second main surface to which the first and second conductive resin layers 141 and 142 are exposed, without the first and second insulating layers 151 and 152 being formed thereon, in the first and second external electrodes, may face the printed circuit board 210, and in this case, the multilayer ceramic capacitor 100 may be electrically connected to the printed circuit board 210 by a solder 230 while the first and second plating layers 161 and 162, formed on the first and second conductive resin layers 141 and 142, respectively, are disposed on the first and second electrode pads 220 so as to contact each other.

When voltages having different polarities are applied to the first and second external electrodes of the multilayer ceramic capacitor 100 in a state in which the multilayer ceramic capacitor 100 is mounted on the printed circuit board 210 as described above, the ceramic body 110 may be expanded and contracted in the thickness direction due to an inverse piezoelectric effect of the dielectric layers 111, and both end surfaces of the first and second external electrodes may be expanded and contracted, contrary to the expansion and contraction in the thickness direction of the ceramic body 110, due to the Poisson effect.

In this case, a central portion of the multilayer ceramic capacitor 100 in the thickness direction, a portion at which the first and second external electrodes are maximally expanded, may be a main factor causing acoustic noise.

However, according to the present exemplary embodiment, the surfaces of the first and second external electrodes mounted on the board may be formed at positions at which displacement of the ceramic body 110 is low and to which vibrations are barely transferred, that is, an upper or lower surface of the ceramic body 110, such that an area of a mounting part may be decreased. Further, the solder 230 may not be formed on both end surfaces and both side surfaces except for the mounting surfaces of the first and second external electrodes due to the first and second insulating layers 151 and 152, such that a height of the solder 230 may be significantly decreased.

Therefore, the generation of acoustic noise may be significantly decreased by suppressing the transfer of vibrations from the first and second external electrodes, in particular, the transfer of vibrations generated in the central portion in which the first and second external electrodes are maximally expanded in the multilayer ceramic capacitor 100 to the printed circuit board 210 through the first and second external electrodes and the solder 230.

In addition, a volume of the solder formed on circumferential surfaces of the first and second external electrodes may be decreased, such that even in the case of mounting (high-density mounting) a plurality of multilayer ceramic capacitors 100 on the printed circuit board 210 at a narrow pitch, a solder bridge connecting the multilayer ceramic capacitors 100 to each other may not be formed between the multilayer ceramic capacitors 100, thereby improving reliability in the component.

Modified Example 1

Figure 5A:
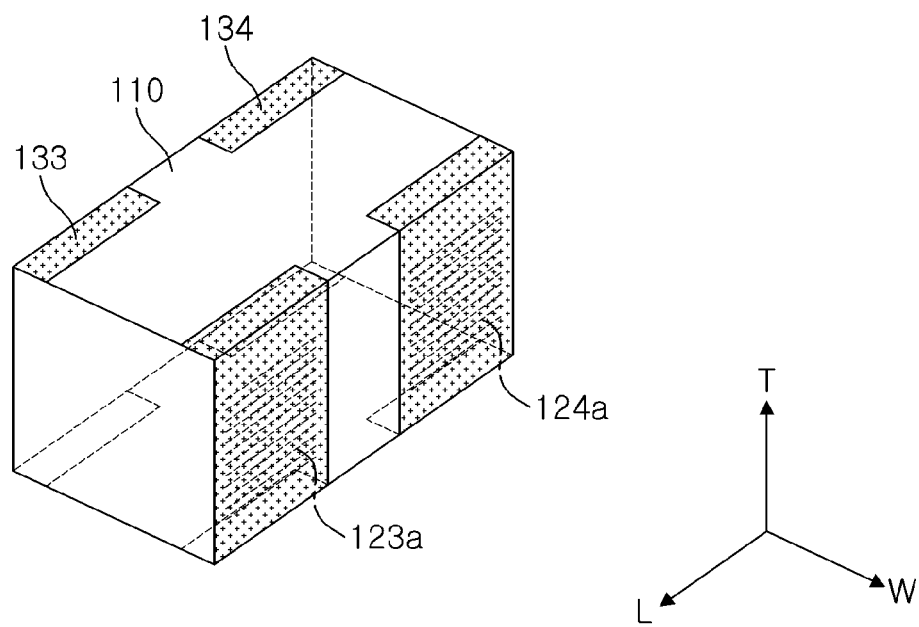
FIGS. 5A through 5D are perspective views showing respective processes of a manufacturing method of a multilayer ceramic capacitor according to another exemplary embodiment of the present disclosure.
Figure 5B:
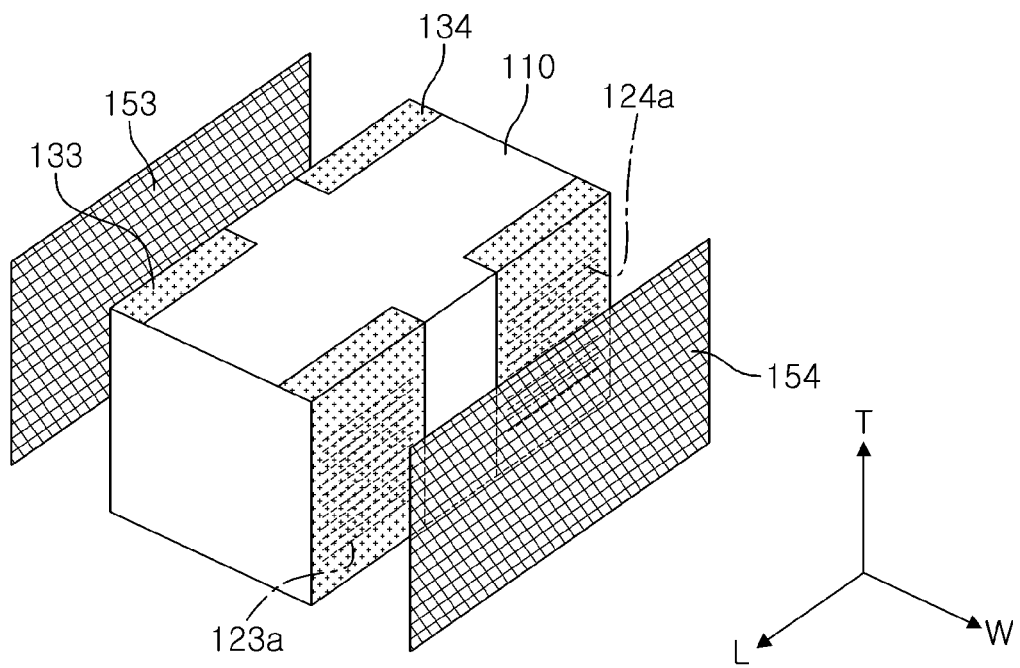
Figure 5C:
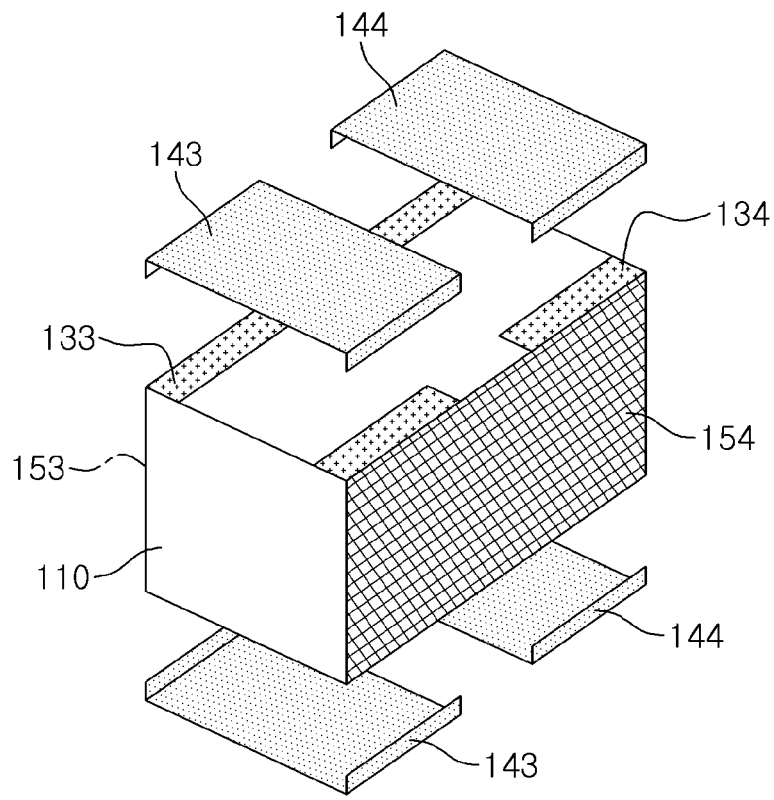
Figure 5C:
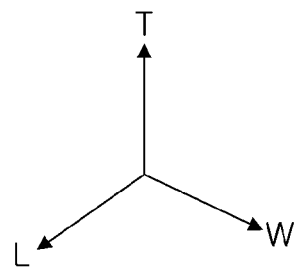
Figure 5D:
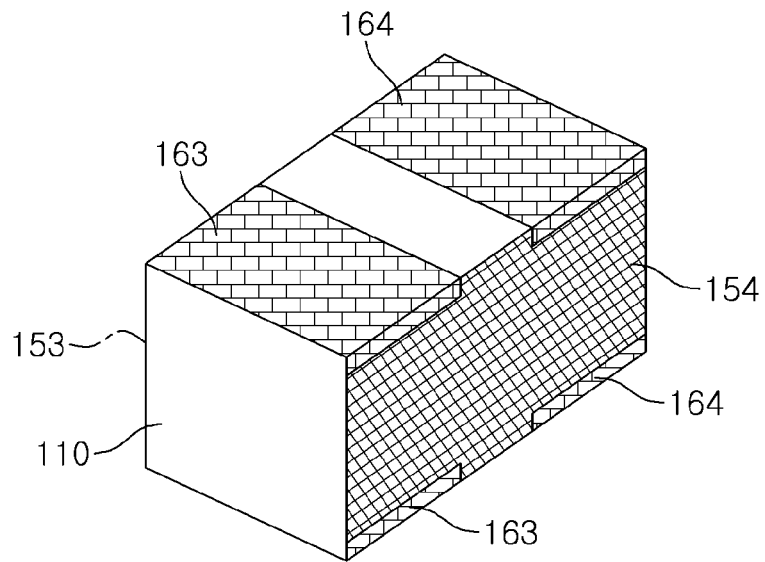
Figure 5D:
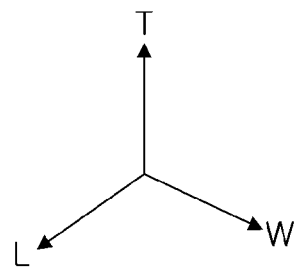
Figure 6:
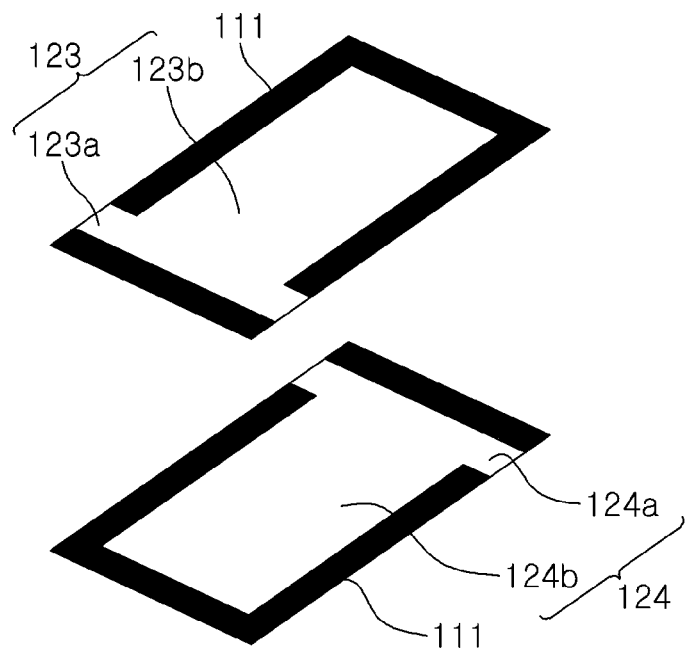
FIG. 6 is an exploded perspective view showing a structure of an internal electrode applied to the multilayer ceramic capacitor of FIGS. 5A through 5D.
Figure 7A:
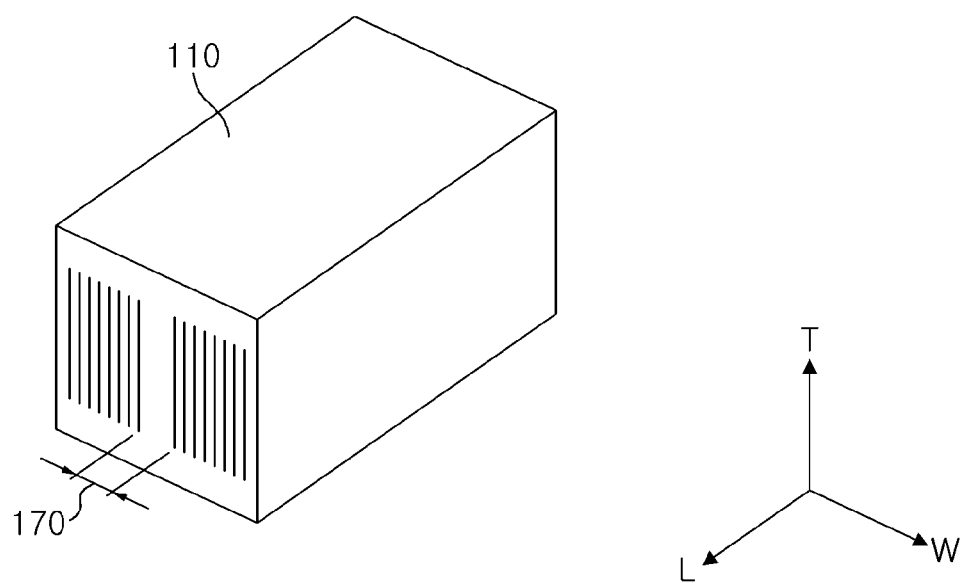
FIGS. 7A through 7E are perspective views showing respective processes of a manufacturing method of a multilayer ceramic capacitor according to another exemplary embodiment of the present disclosure.
Figure 7B:
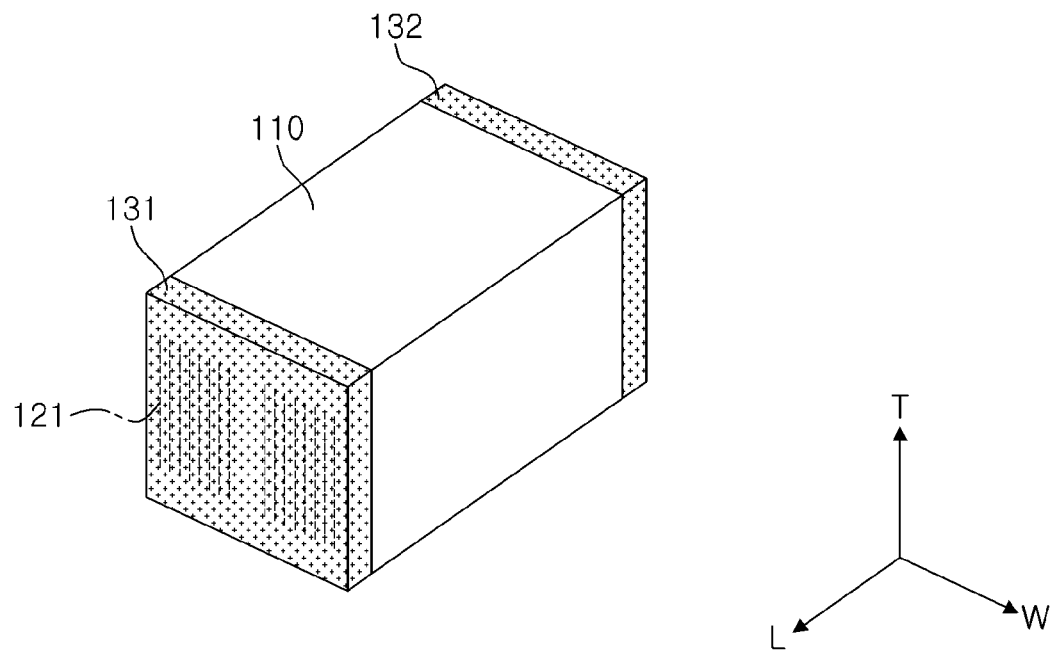
Figure 7C:
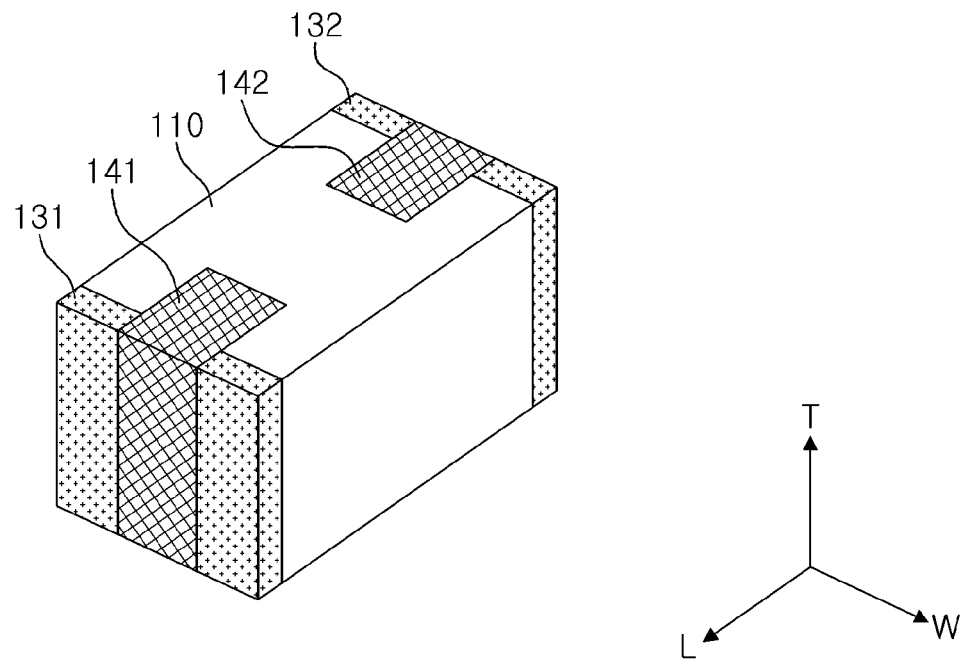
Figure 7D:
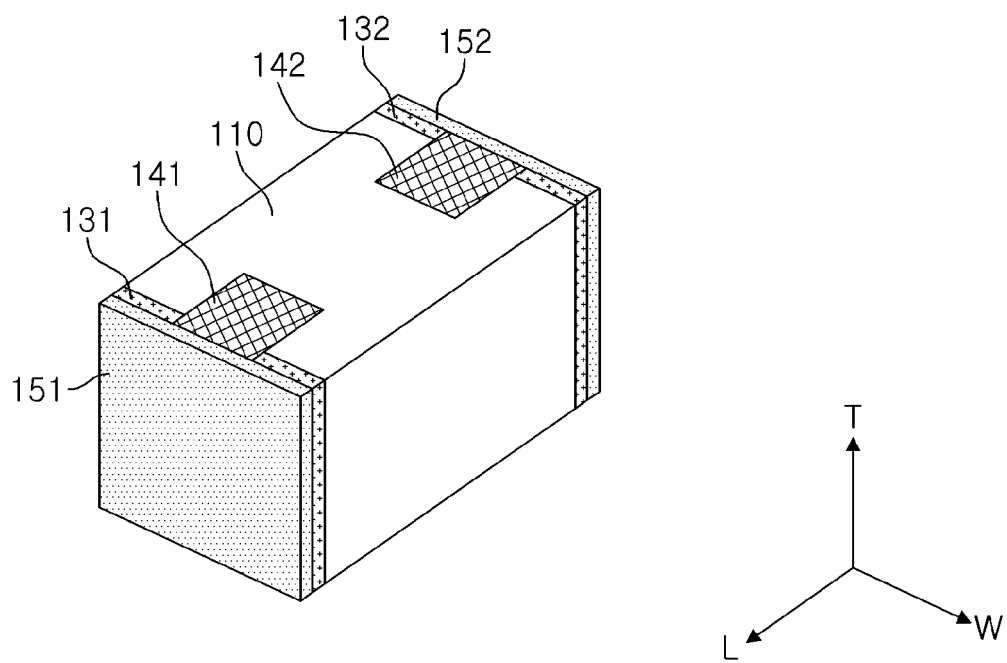
Figure 7E:
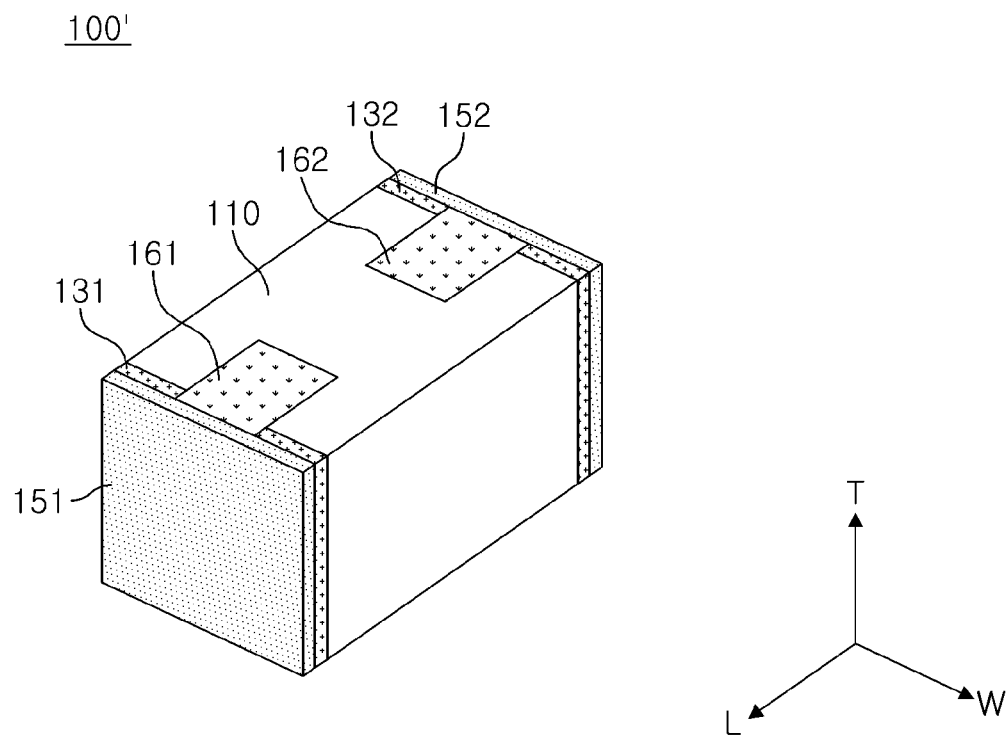

FIGS. 5A through 5D are perspective views showing respective processes of a manufacturing method of a multilayer ceramic capacitor according to another exemplary embodiment of the present disclosure, and FIG. 6 is an exploded perspective view showing a structure of an internal electrode applied to the multilayer ceramic capacitor of FIGS. 5A through 5D.

Referring to FIG. 6, in the present exemplary embodiment, first and second internal electrodes 123 and 124 may have a pair of first lead parts 123a and a pair of second lead parts 124a, exposed to the fifth and sixth side surfaces of the ceramic body 110 in body parts 123b and 124b overlapping each other in the thickness direction, rather than being exposed to third and fourth end surfaces of the ceramic body 110, while being offset from each other in the thickness direction, respectively.

Referring to FIGS. 5A through 5D, in the present exemplary embodiment, structures of the first and second external electrodes may be different from those in the above-mentioned exemplary embodiment due to these structures of the first and second internal electrodes 123 and 124.

That is, the first and second external electrodes may include a pair of first conductive glass layers 133 and a pair of second glass layers 134, a pair of first conductive resin layers 143 and a pair of second conductive resin layers 144, and first and second insulating layers 153 and 154.

In addition, hereinafter, since other configurations except for the structures of the first and second external electrodes are similar to those in the above-mentioned exemplary embodiment, a detailed description will be omitted in order to avoid an overlapped description.

In a cross-section of the ceramic body 110 in a thickness-width direction, the pair of the first conductive glass layers 133 and the pair of second conductive glass layers 134 may be formed to be extended from the fifth and sixth side surfaces to portions of the first and second main surfaces so as to cover the pair of the first lead parts 123a and the pair of the second lead parts 124a that are exposed to the fifth and sixth side surfaces, respectively, to thereby be electrically connected thereto.

The first and second insulating layers 153 and 154 may be formed to be extended from the fifth and sixth side surfaces to portions of the first and second main surfaces so as to cover the pair of the first conductive glass layers 133 and the pair of the second conductive glass layers 134 that are formed on the fifth and sixth side surfaces. In this case, the first and second insulating layers 153 and 154 may have a width smaller than that of the first and second conductive glass layers 133 and 134 formed on the first and second main surfaces in such a manner that that portions of the first and second conductive glass layers 133 and 134 formed on the first and second main surfaces are exposed.

The pair of the first conductive resin layers 143 and the pair of the second conductive resin layers 144 may be formed to be extended from the first and second main surfaces to portions of the fifth and sixth side surfaces so as to cover the pair of the first conductive glass layers 133 and the pair of the second conductive glass layers 134, respectively.

Meanwhile, the first and second external electrodes may further include a pair of first plating layers 163 and a pair of second plating layers 164 that are formed on the first and second conductive resin layers 143 and 144.

Further, the pair of the first plating layers 163 and the pair of the second plating layers 164 may include a nickel (Ni) plating layer formed on the first and second conductive resin layers 143 and 144 and a tin (Sn) plating layer formed on the nickel plating layer.

Hereinafter, a manufacturing method of a multilayer ceramic capacitor according to an exemplary embodiment of the present disclosure will be described.

First, referring to FIG. 5A, a plurality of ceramic sheets having the first and second internal electrodes 123 and 124 formed thereon in such a manner that the first and second internal electrodes 123 and 124 may be disposed to face each other in the thickness direction, having the ceramic sheets interposed therebetween, while having the pair of the first lead parts 123a and the pair of the second lead parts 124a extended to both side surfaces, may be formed and then, pressed to thereby prepare a laminate.

Then, the laminate is cut into portions, each corresponding to one capacitor chip, and then the portions are fired at a high temperature to prepare the ceramic bodies 110 each having first and second main surfaces facing each other in the thickness direction, third and fourth end surfaces facing each other in the length direction, and fifth and sixth side surfaces facing each other in the width direction, to which the pair of the first lead parts 123a and the pair of the second lead parts 124a are exposed.

Next, in a cross-section of the ceramic body 110 in a thickness-width direction, first and second external electrodes may be formed to be electrically connected to exposed first and second lead parts 123a and 124a of the first and the second internal electrodes 123 and 124.

Hereinafter, a forming method of the first and second external electrodes will be described in detail.

First, referring to FIG. 5A, the first and second conductive glass layers 133 and 134 may be formed using a conductive paste containing copper and glass and extended from the fifth and sixth side surfaces of the ceramic body 110 to portions of the first and second main surfaces thereof so as to cover the first and second lead parts 123a and 124a exposed to the fifth and sixth side surfaces of the ceramic body 110.

Next, referring to FIG. 5B, the first and second insulating layers 153 and 154 may be formed using an epoxy resist and extended from the fifth and sixth side surfaces to portions of the first and second main surfaces so as to cover the pair of the first conductive glass layers 133 and the pair of the second conductive glass layers 134 formed on the fifth and sixth side surfaces. In this case, the first and second insulating layers 153 and 154 may have a width smaller than that of the first and second conductive glass layers 133 and 134 formed on the first and second main surfaces.

Thereafter, referring to FIG. 5C, the first and second conductive resin layers 143 and 144 may be formed using a conductive resin paste containing copper and epoxy and extended from the first and second main surfaces to the fifth and sixth side surfaces so as to cover the pair of the first conductive glass layers 133 and the pair of the second conductive glass layers 134 formed on the first and second main surfaces.

In this case, referring to FIG. 5D, if necessary, after the forming of the first and second conductive resin layers 143 and 144, the pair of the first plating layers 163 and the pair of the second plating layers 164 may be formed by plating surfaces of the first and second conductive resin layers 143 and 144 externally exposed from the first and second main surfaces using an electroplating method, or the like.

Modified Example 2

FIGS. 7A through 7E are perspective views showing respective processes of a manufacturing method of a multilayer ceramic capacitor according to another exemplary embodiment of the present disclosure.

Referring to FIGS. 7A through 7E, in the present exemplary embodiment, the dielectric layers 111 may be stacked in the width direction, and a gap layer 170 may be formed in a central portion of the ceramic body 110 in the width direction, such that left and right active layers forming capacitance may be separately formed.

In this case, since an amount of stress applied to the gap layer 170 due to a piezoelectric effect may be low, and deformation may be barely generated as compared to an electrode forming part, stress transferred to a board may be decreased when the first and second external electrodes 131 and 132 are formed on both end surfaces of the ceramic body 110 in which the gap layer 170 is formed as described above.

Referring to FIGS. 7A through 7E, other configurations except for the structures of the first and second internal electrodes in the present exemplary embodiment are similar to those in the above-mentioned exemplary embodiment of the present disclosure, a detailed description thereof will be omitted in order to avoid an overlapped description.

As set forth above, according to exemplary embodiments of the present disclosure, mounting surfaces of the external electrodes are provided on both main surfaces of the ceramic body in the thickness direction, in which the displacement of the ceramic body is low and to which vibrations are barely transferred, to decrease the area of a mounting part. Further, non-conductive insulating layers may be formed on both end surfaces and both side surfaces except for the mounting surfaces of the external electrodes to thereby decrease the height of a solder formed on circumferential surfaces of external electrodes at the time of mounting the multilayer ceramic capacitor on a printed circuit board. Therefore, the transfer of vibrations generated in the multilayer ceramic capacitor to the printed circuit board through the external electrode and the solder may be decreased, thereby decreasing acoustic noise.

In addition, the volume of the solder formed on the circumferential surface of the external electrode is decreased, such that even in the case of mounting the plurality of multilayer ceramic capacitors on the printed circuit board at a narrow pitch, a solder bridge connecting the multilayer ceramic capacitors to each other may not be formed, thereby improving reliability of components.

While exemplary embodiments have been shown and described above, it will be apparent to those skilled in the art that modifications and variations could be made without departing from the spirit and scope of the present disclosure as defined by the appended claims.

What is claimed is:

1. A multilayer ceramic capacitor comprising:
    a ceramic body including a plurality of dielectric layers and having first and second main surfaces facing each other in a thickness direction, third and fourth end surfaces facing each other in a length direction, and fifth and sixth side surfaces facing each other in a width direction;
    a plurality of first and second internal electrodes disposed in the ceramic body to be alternately exposed to the third and fourth end surfaces, having the dielectric layers interposed therebetween; and
    first and second external electrodes electrically connected to the first and second internal electrodes,
    wherein in a cross-section of the ceramic body in a thickness-length direction, the first and second external electrodes include:
    first and second conductive glass layers formed to be extended from the third and fourth end surfaces to portions of the first and second main surfaces;
    first and second conductive resin layers containing copper and an epoxy, formed on the first and second conductive glass layers to be extended from the third and fourth end surfaces to portions of the first and second main surfaces, and having a width greater than that of the first and second conductive glass layers formed on the first and second main surfaces; and
    first and second insulating layers formed to be extended from the third and fourth end surfaces to portions of the first and second main surfaces so as to cover the first and second conductive glass layers and the first and second conductive resin layers formed on the third and fourth end surfaces, while having a width smaller than that of the first and second conductive resin layers formed on the first and second main surfaces.

2. The multilayer ceramic capacitor of claim 1, wherein the ceramic body is formed by stacking the plurality of dielectric layers in the thickness direction.

3. The multilayer ceramic capacitor of claim 1, wherein the ceramic body is formed by stacking the plurality of dielectric layers in the width direction and includes at least one gap layer formed therein in the width direction.

4. The multilayer ceramic capacitor of claim 1, wherein the first and second external electrodes further include first and second plating layers formed on the first and second conductive resin layers in the first and second main surfaces.

5. The multilayer ceramic capacitor of claim 4, wherein the first and second plating layers include:
    a nickel (Ni) plating layer formed on the first and second conductive resin layers; and
    a tin (Sn) plating layer formed on the nickel plating layer.

6. The multilayer ceramic capacitor of claim 1, wherein the first and second insulating layers are formed of an epoxy resist.

7. A multilayer ceramic capacitor comprising:
    a ceramic body including a plurality of dielectric layers stacked in a thickness direction and having first and second main surfaces facing each other in the thickness direction, third and fourth end surfaces facing each other in a length direction, and fifth and sixth side surfaces facing each other in a width direction;
    a plurality of first and second internal electrodes disposed in the ceramic body to face each other, having the dielectric layers interposed therebetween, and having a pair of first lead parts and a pair of second lead parts exposed to the fifth and sixth side surfaces; and
    first and second external electrodes electrically connected to the first and second internal electrodes,
    wherein in a cross-section of the ceramic body in a thickness-width direction, the first and second external electrodes include:
    a pair of first conductive glass layers and a pair of second conductive glass layers formed to be extended from the fifth and sixth side surfaces to portions of the first and second main surfaces so as to cover the pair of the first lead parts and the pair of second lead parts, respectively;
    first and second insulating layers containing copper and epoxy, formed to be extended from the fifth and sixth side surfaces to portions of the first and second main surfaces so as to cover the pair of the first conductive glass layers and the pair of the second conductive glass layers formed on the fifth and sixth side surfaces, and having a width smaller than that of the pair of the first conductive glass layers and the pair of the second conductive glass layers formed on the first and second main surfaces; and a pair of first conductive resin layers and a pair of second conductive resin layers formed to be extended from the first and second main surfaces to portions of the fifth and sixth side surfaces so as to cover the pair of the first conductive glass layers and the pair of the second conductive glass layers formed on the first and second main surfaces, respectively.

8. The multilayer ceramic capacitor of claim 7, wherein the first and second external electrodes further include a pair of first plating layers and a pair of second plating layers formed on the pair of the first conductive resin layers and the pair of the second conductive resin layers, respectively.

9. The multilayer ceramic capacitor of claim 8, wherein the first and second plating layers include:
a nickel (Ni) plating layer formed on the first and second conductive resin layers; and
a tin (Sn) plating layer formed on the nickel plating layer.

10. The multilayer ceramic capacitor of claim 7, wherein the first and second insulating layers are formed of an epoxy resist.

11. A method of manufacturing a multilayer ceramic capacitor, the method comprising:
preparing a laminate by stacking a plurality of ceramic sheets including first and second internal electrodes formed thereon in such a manner that the first and second internal electrodes are disposed to face each other, having the ceramic sheets interposed therebetween, and then pressing the stacked ceramic sheets;
preparing a ceramic body having first and second main surfaces facing each other in a thickness direction, third and fourth end surfaces to which the first and second internal electrodes are alternately exposed in a length direction, and fifth and sixth side surfaces facing each other in a width direction by cutting the laminate into portions each corresponding to one capacitor and firing the cut portion; and
forming first and second external electrodes on the ceramic body to be electrically connected to the first and second internal electrodes,
wherein in a cross-section of the ceramic body in a thickness-length direction, the forming of the first and second external electrodes includes:
forming first and second conductive glass layers to be extended from the third and fourth end surfaces to portions of the first and second main surfaces using a conductive paste containing copper and glass;
forming first and second conductive resin layers to be extended from the third and fourth end surfaces to portions of the first and second main surfaces using a conductive resin paste containing copper and epoxy, and have a width greater than that of the first and second conductive glass layers formed on the first and second main surfaces; and
forming first and second insulating layers to be extended from the third and fourth end surfaces to portions of the first and second main surfaces using an epoxy resist so as to cover the first and second conductive glass layers and the first and second conductive resin layers formed on the third and fourth end surfaces, and to have a width smaller than that of the first and second conductive resin layers formed on the first and second main surfaces.

12. The manufacturing method of claim 11, wherein the preparing of the laminate is performed by stacking and pressing the plurality of ceramic sheets in the thickness direction.

13. The manufacturing method of claim 11, wherein in the preparing of the laminate, the plurality of ceramic sheets are stacked and pressed in the width direction, while the laminate has a gap layer in the width direction by interposing at least one ceramic sheet having no first or second internal electrode formed thereon between the ceramic sheets.

14. The manufacturing method of claim 11, further comprising: after the forming of the first and second insulating layers, plating surfaces of the first and second conductive resin layers on the first and second main surfaces.

15. A method of manufacturing a multilayer ceramic capacitor, the method comprising:
preparing a laminate by stacking a plurality of ceramic sheets including first and second internal electrodes formed thereon in such a manner that the first and second internal electrodes are disposed to face each other, having the ceramic sheets interposed therebetween, while having a pair of first lead parts and a pair of second lead parts extended to both side surfaces, respectively, and then pressing the stacked ceramic sheets;
preparing a ceramic body having first and second main surfaces facing each other in a thickness direction, third and fourth end surfaces facing each other in a length direction, and fifth and sixth side surfaces to which the pair of the first lead parts and the pair of the second lead parts are exposed in a width direction by cutting the laminate into portions each corresponding to one capacitor and firing the cut portion; and
forming first and second external electrodes on the ceramic body to be electrically connected to the first and second internal electrodes,
wherein in a cross-section of the ceramic body in a thickness-width direction, the forming of the first and second external electrodes includes:
forming first and second conductive glass layers using a conductive paste containing copper and glass to be extended from the fifth and sixth side surfaces to portions of the first and second main surfaces so as to cover the pair of first lead parts and the pair of the second lead parts, respectively;
forming first and second insulating layers using an epoxy resist to be extended from the fifth and sixth side surfaces to portions of the first and second main surfaces so as to cover the pair of the first conductive glass layers and the pair of the second conductive glass layers formed on the fifth and sixth side surfaces and to have a width smaller than that of the first and second conductive glass layers formed on the first and second main surfaces; and
forming a pair of first conductive resin layers and a pair of second conductive resin layers using a conductive resin paste containing copper-epoxy to be extended from the first and second main surfaces to the fifth and six side surfaces so as to cover the pair of the first conductive glass layers and the pair of the second conductive glass layers formed on the first and second main surfaces, respectively.

16. The manufacturing method of claim 15, further comprising: after the forming of the first and second conductive resin layers, plating surfaces of the first and second conductive resin layers.

17. A board having a multilayer ceramic capacitor mounted thereon, comprising:

a printed circuit board having first and second electrode pads formed thereon; and at least one multilayer ceramic capacitor installed on the printed circuit board, wherein the multilayer ceramic capacitor includes: a ceramic body including a plurality of dielectric layers and having first and second main surfaces facing each other in a thickness direction, third and fourth end surfaces facing each other in a length direction, and fifth and sixth side surfaces facing each other in a width direction; a plurality of first and second internal electrodes disposed in the ceramic body to be alternately exposed to the third and fourth end surfaces, having the dielectric layers interposed therebetween; and first and second external electrodes electrically connected to the first and second internal electrodes and connected to the first and second electrode pads by a solder on the first or second main surfaces, in a cross-section of the ceramic body in a thickness-length direction, the first and second external electrodes including: first and second conductive glass layers formed to be extended from the third and fourth end surfaces to portions of the first and second main surfaces; first and second conductive resin layers containing copper and an epoxy, formed on the first and second conductive glass layers to be extended from the third and fourth end surfaces to portions of the first and second main surfaces, and having a width greater than that of the first and second conductive glass layers formed on the first and second main surfaces; and first and second insulating layers formed to be extended from the third and fourth end surfaces to portions of the first and second main surfaces so as to cover the first and second conductive glass layers and the first and second conductive resin layers formed on the third and fourth end surfaces, while having a width smaller than that of the first and second conductive resin layers formed on the first and second main surfaces.

18. The board of claim 17, wherein in the multilayer ceramic capacitor, the ceramic body is formed by stacking the plurality of dielectric layers in the thickness direction.

19. The board of claim 17, wherein in the multilayer ceramic capacitor, the ceramic body is formed by stacking the plurality of dielectric layers in the width direction and includes at least one gap layer formed therein in the width direction.

20. The board of claim 17, wherein in the multilayer ceramic capacitor, the first and second external electrodes further include first and second plating layers formed on the first and second conductive resin layers in the first and second main surfaces.

21. The board of claim 20, wherein the first and second plating layers include:
a nickel (Ni) plating layer formed on the first and second conductive resin layers; and
a tin (Sn) plating layer formed on the nickel plating layer.

22. The board of claim 17, wherein in the multilayer ceramic capacitor, the first and second insulating layers are formed of an epoxy resist.

23. A board having a multilayer ceramic capacitor mounted thereon, the board comprising:
a printed circuit board having first and second electrode pads formed thereon; and
at least one multilayer ceramic capacitor installed on the printed circuit board,
wherein the multilayer ceramic capacitor includes: a ceramic body including a plurality of dielectric layers stacked in a thickness direction and having first and second main surfaces facing each other in the thickness direction, third and fourth end surfaces facing each other in a length direction, and fifth and sixth side surfaces facing each other in a width direction; a plurality of first and second internal electrodes disposed in the ceramic body to face each other, having the dielectric layers interposed therebetween, and having a pair of first lead parts and a pair of second lead parts exposed to the fifth and sixth side surfaces; and first and second external electrodes electrically connected to the first and second internal electrodes and connected to the first and second electrode pads by a solder on the first or second main surface,
in a cross-section of the ceramic body in a thickness-width direction, the first and second external electrodes including: a pair of first conductive glass layers and a pair of second conductive glass layers formed to be extended from the fifth and sixth side surfaces to portions of the first and second main surfaces so as to cover the pair of the first lead parts and the pair of second lead parts, respectively; first and second insulating layers containing copper and epoxy, formed to be extended from the fifth and sixth side surfaces to portions of the first and second main surfaces so as to cover the pair of the first conductive glass layers and the pair of the second conductive glass layers formed on the fifth and sixth side surfaces, and having a width smaller than that of the pair of the first conductive glass layers and the pair of the second conductive glass layers formed on the first and second main surfaces; and a pair of first conductive resin layers and a pair of second conductive resin layers formed to be extended from the first and second main surfaces to portions of the fifth and sixth side surfaces so as to cover the pair of the first conductive glass layers and the pair of the second conductive glass layers formed on the first and second main surfaces, respectively.

24. The board of claim 23, wherein in the multilayer ceramic capacitor, the first and second external electrodes further include first and second plating layers formed on the first and second conductive resin layers.

25. The board of claim 24, wherein the first and second plating layers include:
a nickel (Ni) plating layer formed on the first and second conductive resin layers; and
a tin (Sn) plating layer formed on the nickel plating layer.

26. The board of claim 23, wherein in the multilayer ceramic capacitor, the first and second insulating layers are formed of an epoxy resist.

* * * * *